(12) United States Patent
Cortada Acosta et al.

(10) Patent No.: US 10,343,875 B2
(45) Date of Patent: Jul. 9, 2019

(54) TOOL ASSEMBLY AND METHOD FOR LIFTING WIND TURBINE PARTS

(71) Applicant: ALSTOM RENEWABLE TECHNOLOGIES WIND B.V., Ridderkerk (NL)

(72) Inventors: Pere Cortada Acosta, Sant Cugat del Vallès (ES); Ricardo Lázaro, Barcelona (ES); Ferran Roura, Olat (ES); Laura Carrión, Barberà del Vallès (ES)

(73) Assignee: GE RENEWABLE TECHNOLOGIES WIND B.V., Breda (NL)

( * ) Notice: Subject to any disclaimer, the term of this patent is extended or adjusted under 35 U.S.C. 154(b) by 258 days.

(21) Appl. No.: 14/967,017

(22) Filed: Dec. 11, 2015

(65) Prior Publication Data
US 2016/0169191 A1    Jun. 16, 2016

(30) Foreign Application Priority Data
Dec. 15, 2014    (EP) .................................... 14382518

(51) Int. Cl.
| | |
|---|---|
| B66C 1/10 | (2006.01) |
| F03D 1/06 | (2006.01) |
| B66C 1/66 | (2006.01) |
| F03D 9/25 | (2016.01) |
| F03D 13/10 | (2016.01) |

(Continued)

(52) U.S. Cl.
CPC ................ *B66C 1/108* (2013.01); *B66C 1/66* (2013.01); *F03D 1/06* (2013.01); *F03D 9/25* (2016.05); *F03D 13/10* (2016.05); *F03D 13/20* (2016.05); *F03D 15/00* (2016.05);
(Continued)

(58) Field of Classification Search
CPC . B66C 1/108; B66C 1/66; F03D 13/10; F03D 13/20; F03D 15/00; F03D 9/25; F03D 1/06; F05B 2230/61
See application file for complete search history.

(56) References Cited

U.S. PATENT DOCUMENTS

| 8,562,302 B2 | 10/2013 | Bakhuis et al. |
| 2007/0258823 A1 | 11/2007 | Haarh et al. |

(Continued)

FOREIGN PATENT DOCUMENTS

| DE | 102011052994 | 2/2013 |
| EP | 0153814 | 9/1985 |

(Continued)

OTHER PUBLICATIONS

European Search Report for EP 14382518, dated Jul. 1, 2015, 6 pgs.

*Primary Examiner* — Moshe Wilensky
(74) *Attorney, Agent, or Firm* — Dority & Manning, P.A.

(57) ABSTRACT

The assembly includes a tool with a stem having a first end having a projecting portion such as a ring, and a second end adapted to be engaged by lifting equipment. The assembly also includes a stem receiving portion formed in a wind turbine part to be lifted. The stem of the tool is adapted to be freely passed through the stem receiving portion until the first end of the stem is locked to the stem receiving portion, thereby preventing the stem from separating from the stem receiving portion when lifting the wind turbine part.

10 Claims, 4 Drawing Sheets

(51) Int. Cl.
*F03D 15/00* (2016.01)
*F03D 13/20* (2016.01)

(52) U.S. Cl.
CPC ......... *F05B 2230/61* (2013.01); *Y02E 10/721* (2013.01); *Y02E 10/726* (2013.01); *Y02P 70/523* (2015.11)

(56) References Cited

U.S. PATENT DOCUMENTS

2009/0324380 A1* 12/2009 Pedersen ................ F03D 1/001 414/800
2013/0236324 A1   9/2013 Bech et al.
2014/0341742 A1* 11/2014 Knoop .................... B66C 1/108 416/215

FOREIGN PATENT DOCUMENTS

| WO | WO2005071261 | 8/2005 |
| WO | WO2010083837 | 7/2010 |
| WO | WO2014150950 | 9/2014 |

* cited by examiner

TOOL ASSEMBLY AND METHOD FOR LIFTING WIND TURBINE PARTS

Tool assemblies and methods are disclosed herein for lifting heavy parts of a wind turbine. This application claims priority to EP 14382518.0, filed Dec. 15, 2014, the entire contents of which are hereby incorporated by reference.

BACKGROUND

Wind turbines include large and heavy parts such as a nacelle, a generator, a rotor, a gearbox, tower sections and the like. Such large and heavy parts should be handled, e.g. lifted, etc., usually in manufacturing, installation, transport, repair and replacement operations, through the use of lifting equipment such as lifting cranes or the like. The weight and the size of said large and heavy parts to be handled result in that said manufacturing, installation, transport, repair and replacement operations are difficult to be carried out. In addition, cranes used for lifting such parts are bulky and expensive, especially in offshore environment.

A number of solutions for lifting wind turbine parts have been proposed in the art. Lifting tools, such as lugs, hooks or the like are attached to the wind turbine part to be lifted which may be, for example, a structural component, by means of bolted connections.

WO2005071261 discloses the use of a tool for handling a wind turbine blade. The tool comprises two bracket-like components between which the blade is attached. Tool attachment is carried out by bolts extending through blade mounting holes. Each bracket-like component comprises a plate having the same profile as the blade and provided with flanges having a fastening hole.

U.S. Pat. No. 8,562,302 discloses a wind turbine blade having a structure for handling the blade. Such handling structure comprises attachment bores having threaded female channels for receiving a handling mechanism. Said attachment bores are formed in structural members engaged with internal spar caps extending within the blade.

Although current solutions are technically efficient, they use bolted, i.e. threaded, connections to attach the handling components to the wind turbine part to be lifted. This results in that disassembling operations take a long time and involve undesirable additional costs together with unsafe conditions for workers who have to perform operations in risky sites of the wind turbine under unsafe conditions at large heights, such as outside the nacelle, while the lifting equipment might be still in operation. In addition, removal of bolts must be carried out through the use of hydraulic tools which are heavy and require electric and/or hydraulic power to be operated and which also have to be transported up to such critical positions.

SUMMARY

A tool assembly is provided herein with which the above prior art disadvantages can be at least reduced when lifting wind turbine parts such as the nacelle, the rotor, the generator, the gearbox, tower sections and parts thereof.

The present assembly comprises a tool that may comprise, for example, an elongated body defining a stem with a first end and a second end. The assembly further comprises a stem receiving portion that is part of, is formed in, or is associated with a wind turbine part to be lifted. In one example, the stem receiving portion may be an opening formed in the part of the wind turbine to be lifted, such as, for example, the hub.

The stem of the tool is adapted to be freely passed through the stem receiving portion. Therefore, no threaded portions are provided inside the stem receiving portion. The fact that the stem can be freely passed through the stem receiving portion does not necessarily involve a direct contact between the outer surface of the stem and the inner surface of the stem receiving portion. However, in many cases, there would be contact between the stem and the stem receiving portion as the stem is passed sliding through the stem receiving portion. In any case, the stem of the tool can be freely passed through the stem receiving portion until the first end of the stem is locked such that it can not come off the stem receiving portion when the lifting equipment pulls the tool outwards for lifting the wind turbine part.

The second end of the stem may be adapted to be engaged by the lifting equipment. A quick release engagement is preferably used.

It is also preferred that the stem receiving portion is defined by at least substantially vertical walls so that the stem of the tool is vertical when it is inserted therein. A vertical position of the tool allows the lifting equipment to efficiently handle the wind turbine part.

The first end of the stem may be adapted to be releasably locked to the stem receiving portion. The tool can be thus removed from the wind turbine part once it has been lifted as compared with prior solutions where the lifting tool is permanent so it remains attached to the wind turbine part after its handling has been completed. The present lifting tool assembly can be thus reused in other lifting operations so no unnecessary weight is added to the wind turbine.

In order to lock the tool to the wind turbine part to be lifted, the first end of the stem may be provided, for example, with a portion projecting, e.g. radially, from the stem such that the stem can not be passed through the stem receiving portion when the stem is pulled out by the crane for lifting the wind turbine part.

Different implementations are possible for the stem projecting portion to lock the tool to the stem receiving portion.

In one example, the stem projecting portion comprises a ring. The ring may be formed of at least two pieces. Said pieces may be the same in size or they may be different from each other. The pieces of the ring can be coupled to each other such that the thus formed ring surrounds the first end of the stem of the tool. The pieces of the ring can decoupled from each other as required. In general, the stem projecting portion may be removable from the first end of the stem.

The use of ring shaped projecting portion has the advantage that the parts to be handled are light in weight, specifically they weight less than the maximum permissible load that can be handled by an operator. Therefore, no external aid is required, such as by a crane or hoisting device, to handle the inner parts.

The stem receiving portion may be provided with an enlarged portion formed therein. Thus, the projecting portion may be adapted to be at least partially fitted into said enlarged portion of the stem receiving portion. Such enlarged portion may comprise a flat area which may, for example, be machined inside the stem receiving portion. The purpose of the enlarged portion is to provide good contact between the stem and the stem receiving portion. The flat area can be preferably inclined in order to provide an increased contact surface and better pressure distribution therebetween. Said arrangement of the stem receiving portion and the stem projecting portion allows the different parts to withstand mainly compressive forces during lifting.

In a further example of the stem projecting portion, at least one wedge part is provided. The wedge part is adapted to cooperate with the stem such that the relative displacement of the wedge part and the stem causes the diameter of the first end of the stem to increase preventing the stem from being passed through the stem receiving portion when the stem of the tool is pulled out for lifting the wind turbine part.

In any case, a stop plate may be also provided for distributing loads in use. The stop plate is mounted at the first end of the stem, between the stem projecting portion and the wind turbine part. The stop plate may be formed as a separate part from the stem projecting portion of forming part of the stem. The stop plate may surround completely or partially the stem.

The stem of the tool may further comprise holding means adapted to temporary hold the stem to the stem receiving portion until the stem is pulled by the lifting equipment. Specifically, such holding means may be adapted to keep the stem projecting portion fitted into the enlarged portion of the stem receiving portion. The holding means may comprise a protrusion projecting from the stem. Such protrusion may be formed in a portion opposite the stem projecting portion in a way that the stem of the tool is arranged at a predetermined relative position with respect to the stem receiving portion. Finally, in some cases it may be preferred that the stem of the tool is suitably sealed to the stem receiving portion when it is inserted therein. Sealing may be carried out at least in the contact surface between the stem of the tool and the stem receiving portion in the exterior of the wind turbine part. Alternatively, sealing may be carried out in the contact surface between the stem of the tool and the stem receiving portion in the interior of the wind turbine part. However, sealing may be carried out in the contact surface between the stem of the tool and the stem receiving portion both in the exterior and in the interior of the wind turbine part if required.

A method for lifting a wind turbine part is also provided herein. The lifting method comprises the steps of providing a lifting tool such as the one described above and passing said tool through a stem receiving portion formed in a wind turbine part.

Passing the tool through the stem receiving portion may be carried out from the outside of the wind turbine part through the use of a lifting crane. Then, a stem projecting portion is formed projecting outwards after which the stem of the tool is pulled outwards (upwards in the drawing) such that the stem is locked in the inner surface of the stem receiving portion in a way that the stem can not come off the stem receiving portion and therefore the wind turbine part can be lifted. Locking of the stem of the tool to the wind turbine part allows the wind turbine part to be lifted by the lifting crane.

Once the wind turbine part has been lifted, the method may include a step of disengaging the lifting equipment, e.g. the crane, from the stem of the tool and removing the tool from the wind turbine part.

The most important advantage of the present tool assembly relates to safety. Typical bolted solutions may require workers to be outside a nacelle to remove a great number of bolts with heavy tools. By contrast, with the present tool assembly the operator works safely from the inside of the wind turbine part, for example, the hub.

A very safe, fast, simple and easy lifting of wind turbine parts is obtained while costs are reduced. In addition, as compared with current bolted solutions, the present tool assembly and the method for lifting wind turbine parts using said tool are very simple and cost effective as a reduced number of parts and steps are involved. This differs from current bolted solutions requiring a large amount of bolts, such as twenty or more bolts, for attaching structures such as shaped plates, flanges, lugs or the like to the wind turbine part to be lifted. Instead, the present tool assembly only requires a receiving portion and a lifting tool to be received therein whose stem is adapted to be freely passed therethrough and locked therein when the wind turbine is part lifted.

The present tool assembly is very easy to apply to the wind turbine part to be lifted and therefore is less time consuming. In addition, the present tool assembly is also easy to disassemble also with resulting time savings. Finally, it is to be noted that no additional tools are required to lift the wind turbine part using the present tool assembly.

Additional objects, advantages and features of examples of the tool assembly and method for lifting wind turbine parts will become apparent to those skilled in the art upon examination of the description, or may be learned by practice thereof.

BRIEF DESCRIPTION OF THE DRAWINGS

Particular examples of the present tool for lifting wind turbine parts will be described in the following by way of non-limiting examples, with reference to the appended drawings, in which.

DETAILED DESCRIPTION OF EXAMPLES

Figure 1:
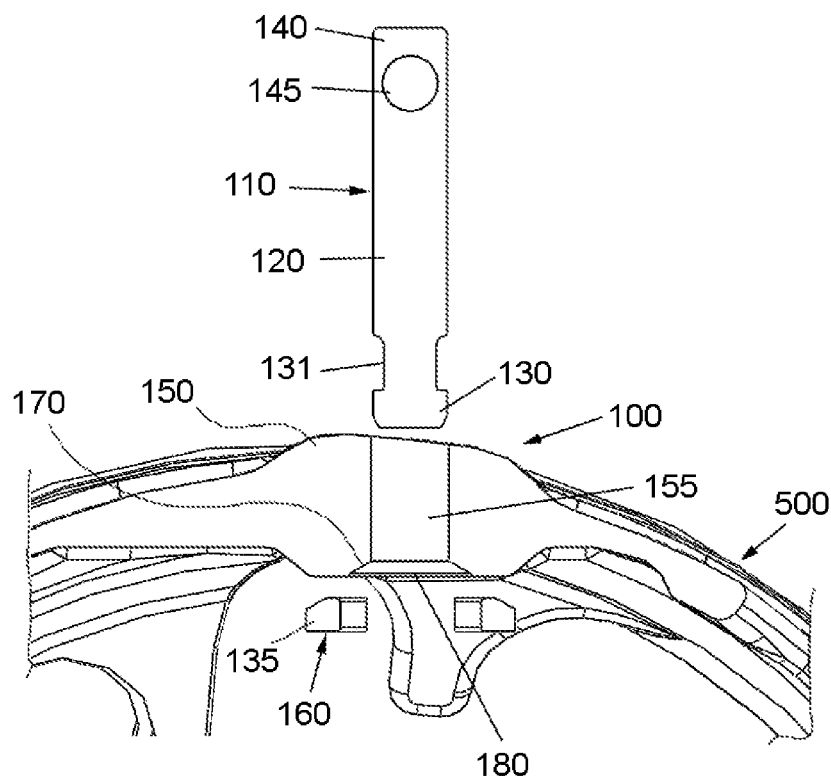
FIGS. 1-6 are diagrammatic views showing one example of the present tool assembly where the main steps of a method for lifting a wind turbine part using the tool are illustrated.
Figure 2:
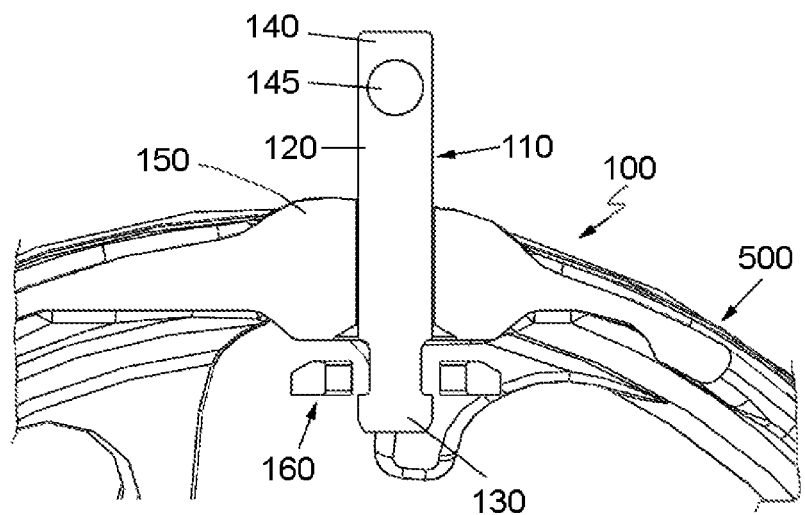

One of the many possible examples of the present tool assembly for lifting a wind turbine part is shown in the figures. Examples of a wind turbine part to be lifted through the present tool assembly are the wind turbine rotor, the nacelle, the generator, the gearbox, tower sections, and parts thereof. In the specific example shown in the figures, the wind turbine part to be lifted corresponds to a wind turbine hub 500.

In the specific example shown in the figures, the assembly 100 comprises a tool 110 in the form of a cylindrical body defining a stem 120 having a first end 130 and a second end 140.

Figure 3:
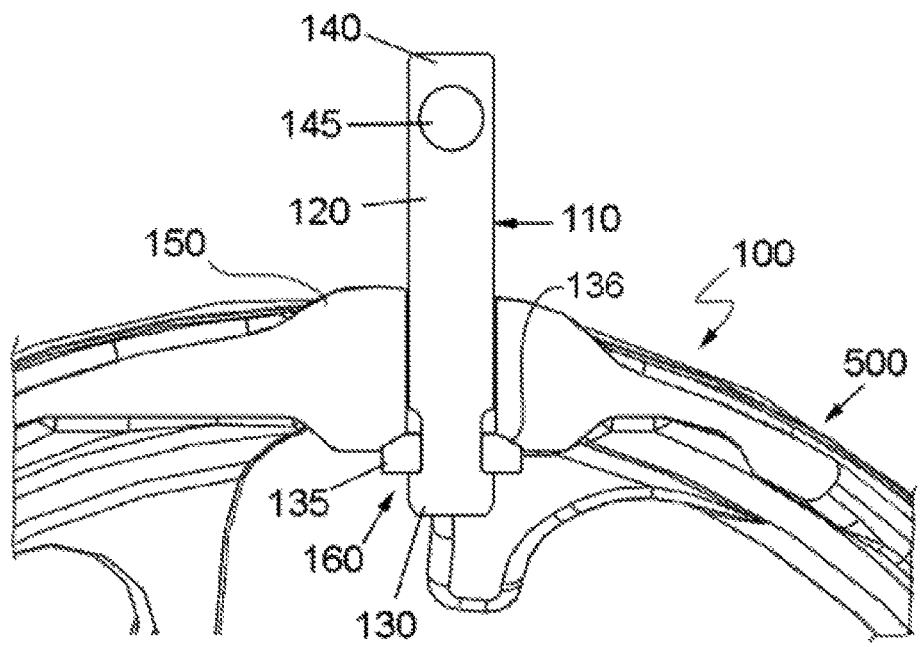
Figure 4:
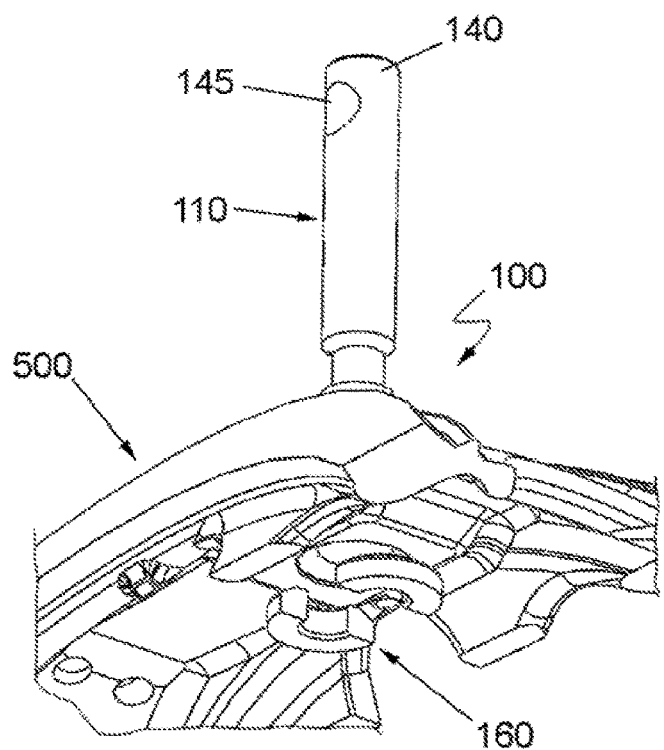
Figure 5:
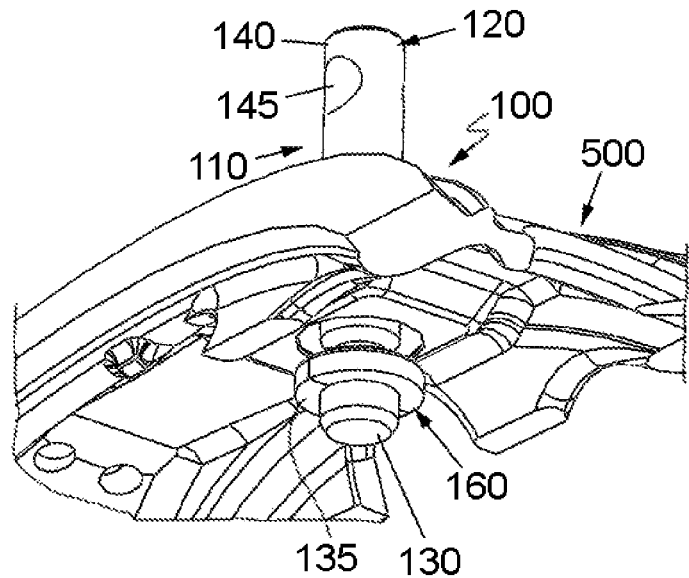
Figure 6:
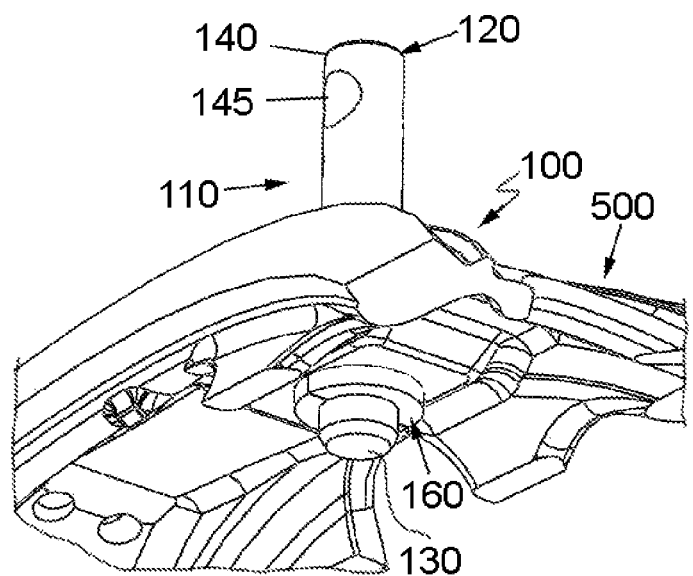

The first end 130 of the stem 120 (lower end in the figures) has a radial recess 131. The radial recess 131 is adapted for receiving a portion 135, which when received in the recess 131 projects radially from the recess 131 of the stem 120 as shown in FIG. 3. In the specific example shown, the stem projecting portion 135 comprises a ring 160 that is formed of two pieces. The two pieces of the ring 160 can be coupled with each other so that, in an assembled condition, the two pieces of the ring 160 are arranged surrounding the recess 131 of the stem 120, as shown in FIGS. 3 and 6. The two pieces of the ring 160 can be decoupled from each other when the stem projecting portion 135 is required to be removed from the first end 130 of the stem 120.

The provision of ring 160 results in that parts to be handled are light in weight, specifically they weight less than the maximum permissible load that can be handled by an operator. Therefore, handling inner parts does not require an external aid such as the crane.

The second end 140 of the stem 120 has a through bore 145 adapted to be engaged by lifting equipment such as a crane (not shown).

A stem receiving portion 150 is formed in the hub 500 of the wind turbine. The stem receiving portion 150 in the example shown consists of a smooth-walled cylindrical opening 155 formed in the hub 500. Said cylindrical opening 155 is conveniently sized for receiving the stem 120 of the tool 110 such that the stem 120 can be freely passed therethrough.

For lifting the hub 500, the above tool assembly 100 is provided. The tool 110 is installed by passing its stem 120 freely through the stem receiving portion 150 from the outside of the hub 500 by means of a crane (not shown) that holds the tool 110 by the through bore 145 of the second end 140 of the stem 120. The operator, who is inside the hub 500, places the two pieces of the ring 160 around the recess 131 in the first end 130 of the stem 120.

With the stem 120 engaged with the ring 160 mounted at the first end 130 of the stem 120, wherein the stem projecting portion 135 projects from the recess 131, the stem 120 of the tool 110 is passed through the stem receiving portion 150 upwards in the drawings as the stem 120 is lifted by the crane.

Lifting of the tool 110 causes it to be passed through the stem receiving portion 150 upwards until the ring 160 in the first end 130 of the stem 120 abuts an enlarged portion 170 formed in a lower end 180 inside the stem receiving portion 150 in the form of an inclined flat area.

In this position where the stem 120 is locked to the stem receiving portion 150, the stem 120 is positioned vertical when it has been inserted into the stem receiving portion 150 and it is prevented from passing through the stem receiving portion 150 completely as the hub 500 is being lifted by the crane.

Referring again to FIG. 3, a wedge part 136 is provided. The wedge part 136 is adapted to cooperate with the stem 120 such that the relative displacement of the wedge part 136 and the stem 120 causes the diameter of the first end of the stem 120 to increase, thereby preventing the stem 120 from being passed through the stem receiving portion 150 when the stem 120 of the tool is pulled out for lifting the wind turbine part.

Temporary holding means, not shown, may be used to hold the stem 120 of the tool 110 to the stem receiving portion 150 until the stem 120 of the tool 110 is pulled by the crane. In the particular example shown in FIGS. 7 and 8, the holding means comprise a radial protrusion 190 projecting from the stem 120. The tool 110 is thus inserted downwards into the stem receiving portion 150 until the radial protrusion 190 abuts the outer surface of the hub 500. This results in that the stem 120 is arranged at a predetermined relative position with respect to the stem receiving portion 150 suitable for being pulled by the crane.

Figure 7:
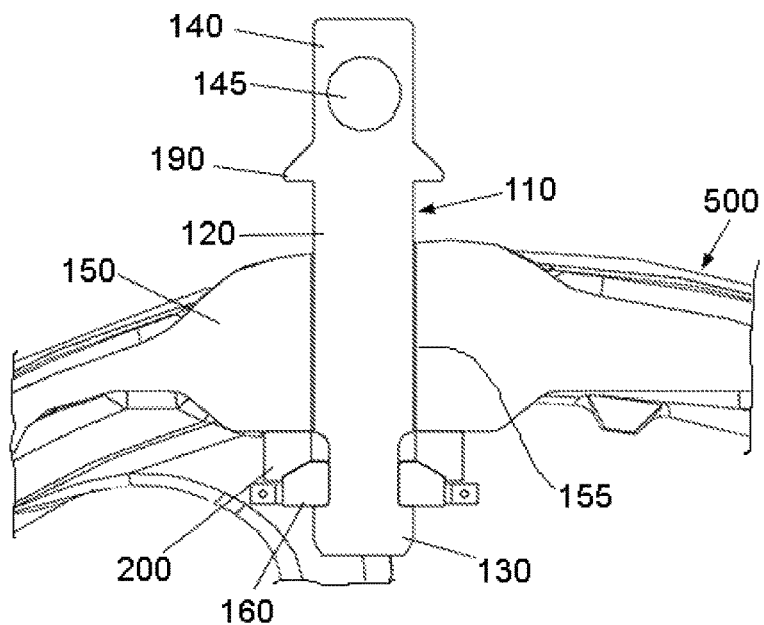
FIGS. 7 and 8 are respectively a diagrammatic elevational and perspective view showing a particular example of the holding means to temporary hold the tool stem to the stem receiving portion.
Figure 8:
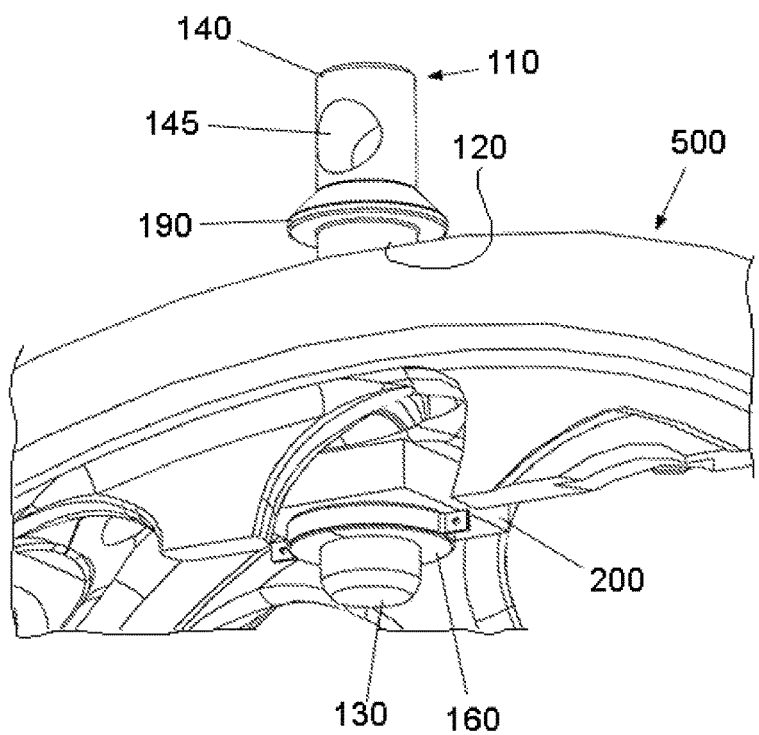

Again referring to FIGS. 7 and 8, a stop plate 200 is provided in this example. The purpose of the stop plate 200 is to evenly distribute compressive loads on the lower portion of the stem receiving portion 150 when the tool 110 is in use, with its stem 120 fitted into the stem receiving portion 150. As shown in FIG. 7, the stop plate 200 is mounted at the first end 120 of the stem 120, between the ring 160 and the hub 500, against a lower portion of the stem receiving portion 150. Compressive loads in the ring 160 are thus evenly distributed over a wider area on said lower portion of the stem receiving portion 150, inside the hub 500.

A step of providing a seal between the stem 120 of the tool 110 and the stem receiving portion 150 may be carried out before lifting the hub 500 of the wind turbine.

When the hub 500 of the wind turbine has been lifted, the crane is disengaged from the through bore 145 of the second end 140 of the stem 120 and the tool 110 is removed by the operator from the hub 500. Once the tool 110 has been removed, the stem receiving portion 150 may be properly sealed or covered preventing water, dirt, objects, etc. from entering the stem receiving portion 150.

Although only a number of particular examples and examples of the tool assembly and method for lifting wind turbine parts have been disclosed herein, it will be understood by those skilled in the art that other alternative examples and/or uses and obvious modifications and equivalents thereof are possible. Furthermore, the present disclosure covers all possible combinations of the particular examples described. Thus, the scope of the present disclosure should not be limited by particular examples, but should be determined only by a fair reading of the claims that follow.

The invention claimed is:

1. An assembly for lifting a wind turbine nacelle or hub, wherein the wind turbine nacelle or hub includes an external outer wall and an external inner wall, the external inner wall facing an internal cavity area within the wind turbine nacelle or hub, the assembly comprising:
   a tool having a stem, a first end and a second end, wherein the tool has a length so as to extend through the external outer and inner walls of the nacelle or hub into the interior cavity area of the nacelle or hub so that the first end is accessible to a person within the interior cavity region;
   the assembly further comprising a stem receiving portion configured with the external outer and inner walls of the nacelle or hub and having an opening therethrough into the interior cavity area of the nacelle or hub;
   a releasable lock configured around the first end of the stem within the interior cavity area of the nacelle or hub; and
   wherein the stem of the tool is adapted to freely pass through the opening in the stem receiving portion until the first end of the stem passes through the stem receiving portion into the interior cavity area and is locked against a bottom portion of the stem receiving portion by the releasable lock applied around the first end of the stem by the person in the interior cavity area, thereby preventing the stem from separating from the stem receiving portion when the nacelle or hub is lifted by the tool,
   wherein the releasable lock comprises a stem projecting portion releasably attached to the first end of the stem so as to surround and project radially from the stem such that the stem cannot be passed through the stem receiving portion when the wind turbine art is lifted by the tool, and
   wherein the stem projecting portion comprises a ring, the ring comprising two pieces selectively coupled in an assembled condition to surround and project radially from the first end of the stem.

2. The assembly of claim 1, wherein the second end of the stem is adapted to be engaged by a lifting equipment.

3. The assembly of claim 1, wherein the opening in the stem receiving portion is defined by substantially vertical walls so that the stem of the tool is vertical when passed through the stem receiving portion.

4. The assembly of claim 1, wherein the stem projecting portion is adapted to be at least partially fitted into an enlarged portion formed in the stem receiving portion when the wind turbine part is lifted by the tool.

5. The assembly of claim 1, wherein the releasable lock further comprises at least one wedge part disposed such that the relative displacement of the wedge part and the stem of the tool causes the wedge part to engage the stem receiving portion to prevent the stem from being passed through the stem receiving portion when the stem of the tool is pulled out for lifting the nacelle or hub.

6. The assembly of claim 1, wherein the assembly further comprises a holding means to temporary hold the stem to the stem receiving portion until the stem is engaged by the lifting equipment.

7. The assembly of claim 6, wherein the holding means comprises a protrusion projecting from the stem such that the stem is arranged at a predetermined relative position with respect to the stem receiving portion.

8. The assembly of claim 1, wherein the assembly further comprises a stop plate provided at the first end of the stem, between the stem projecting portion and the nacelle or hub.

9. The assembly of claim 2, wherein the second end of the stem includes a through bore adapted to be engaged by the lifting equipment.

10. The assembly of claim 6, wherein the holding means is positioned closer to the external outer wall than engagement means of the second end of the stem configured to be engaged by the lifting equipment.

* * * * *